United States Patent
Johnson

[11] Patent Number: 6,059,503
[45] Date of Patent: May 9, 2000

[54] CAPTIVATED FASTENER ASSEMBLY

[76] Inventor: H. Thad Johnson, 9002 Hidden Trail, Davisburg, Mich. 48350

[21] Appl. No.: 09/179,742

[22] Filed: Oct. 27, 1998

[51] Int. Cl.[7] .................................................. F16B 21/18
[52] U.S. Cl. .......................................... 411/353; 411/999
[58] Field of Search .................................. 411/107, 353, 411/970, 999

[56] References Cited

U.S. PATENT DOCUMENTS

| | | | |
|---|---|---|---|
| 1,409,606 | 3/1922 | Standahl | 411/353 |
| 1,572,770 | 2/1926 | Colley . | |
| 1,788,408 | 1/1931 | Raybould | 411/999 |
| 2,374,743 | 5/1945 | Granville . | |
| 2,409,519 | 10/1946 | Rosenthal | 411/999 |
| 2,709,470 | 5/1955 | Knohl | 411/999 |
| 2,761,484 | 9/1956 | Sternick | 411/353 |
| 2,931,412 | 4/1960 | Wing . | |
| 3,008,368 | 11/1961 | Hammitt et al. . | |
| 3,083,796 | 4/1963 | Bell, Jr. . | |
| 3,090,203 | 5/1963 | Durget . | |
| 3,137,195 | 6/1964 | Rosenberg . | |
| 3,217,774 | 11/1965 | Pelochino . | |
| 3,221,847 | 12/1965 | Attwood . | |
| 3,250,559 | 5/1966 | Sommerfeld | 411/999 |
| 3,262,480 | 7/1966 | Storch . | |
| 3,447,229 | 6/1969 | Clark . | |
| 3,452,636 | 7/1969 | Cohen et al. . | |
| 3,474,847 | 10/1969 | Bedford | 411/999 |
| 4,306,708 | 12/1981 | Gassaway . | |
| 4,309,123 | 1/1982 | Moore . | |
| 4,334,599 | 6/1982 | Ritsema et al. . | |
| 4,435,112 | 3/1984 | Becker . | |
| 4,607,992 | 8/1986 | Mauritz et al. . | |
| 4,732,519 | 3/1988 | Wagner . | |
| 4,844,677 | 7/1989 | Schwartzman . | |
| 4,971,497 | 11/1990 | Stoffer et al. . | |
| 4,979,858 | 12/1990 | Van Allman et al. . | |
| 4,999,019 | 3/1991 | Kraus . | |
| 5,094,579 | 3/1992 | Johnson . | |
| 5,141,357 | 8/1992 | Sherman et al. . | |
| 5,154,559 | 10/1992 | Wagner . | |
| 5,165,834 | 11/1992 | Takenouchi . | |
| 5,199,152 | 4/1993 | Wagner . | |
| 5,209,620 | 5/1993 | Zare-Ardestani . | |
| 5,255,647 | 10/1993 | Kiczek | 411/353 |
| 5,328,311 | 7/1994 | Knohl . | |
| 5,395,194 | 3/1995 | Johnson et al. . | |
| 5,509,752 | 4/1996 | Kocisek . | |
| 5,662,444 | 9/1997 | Schmidt, Jr. . | |
| 5,664,922 | 9/1997 | Janssen . | |
| 5,711,711 | 1/1998 | Schmidt, Jr. . | |

FOREIGN PATENT DOCUMENTS

| | | |
|---|---|---|
| 3706616 | 9/1988 | Germany . |
| 855297 | 11/1960 | United Kingdom . |
| 929149 | 6/1963 | United Kingdom . |

*Primary Examiner*—Flemming Saether
*Attorney, Agent, or Firm*—Harness, Dickey & Pierce, P.L.C.

[57] ABSTRACT

A captivated fastener assembly and method of making it are disclosed which incorporates a flexible retainer which is designed to allow the fastener to slide axially relative to the workpiece while preventing separation thereof. The retainer eliminates the need for specially formed fasteners or workpieces.

13 Claims, 3 Drawing Sheets

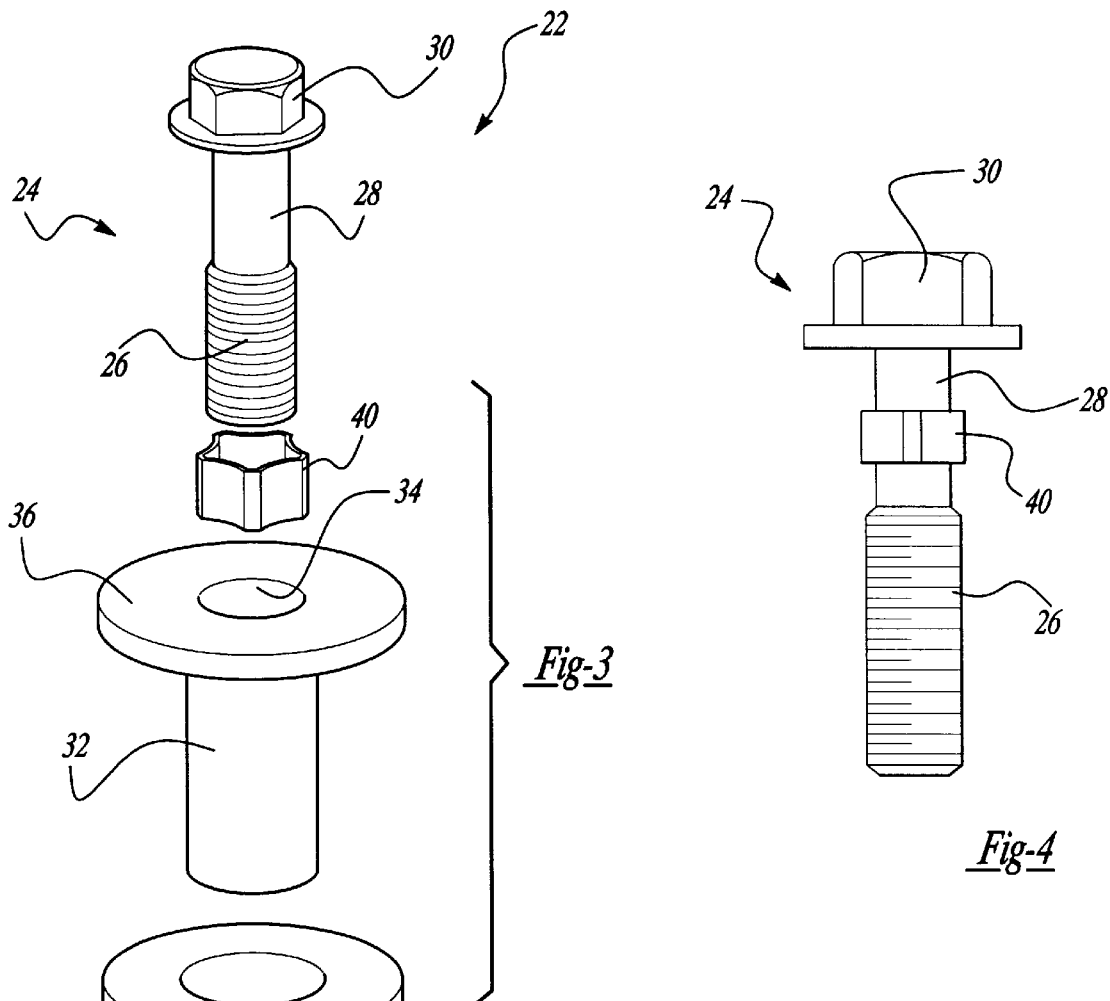
*Fig-3*
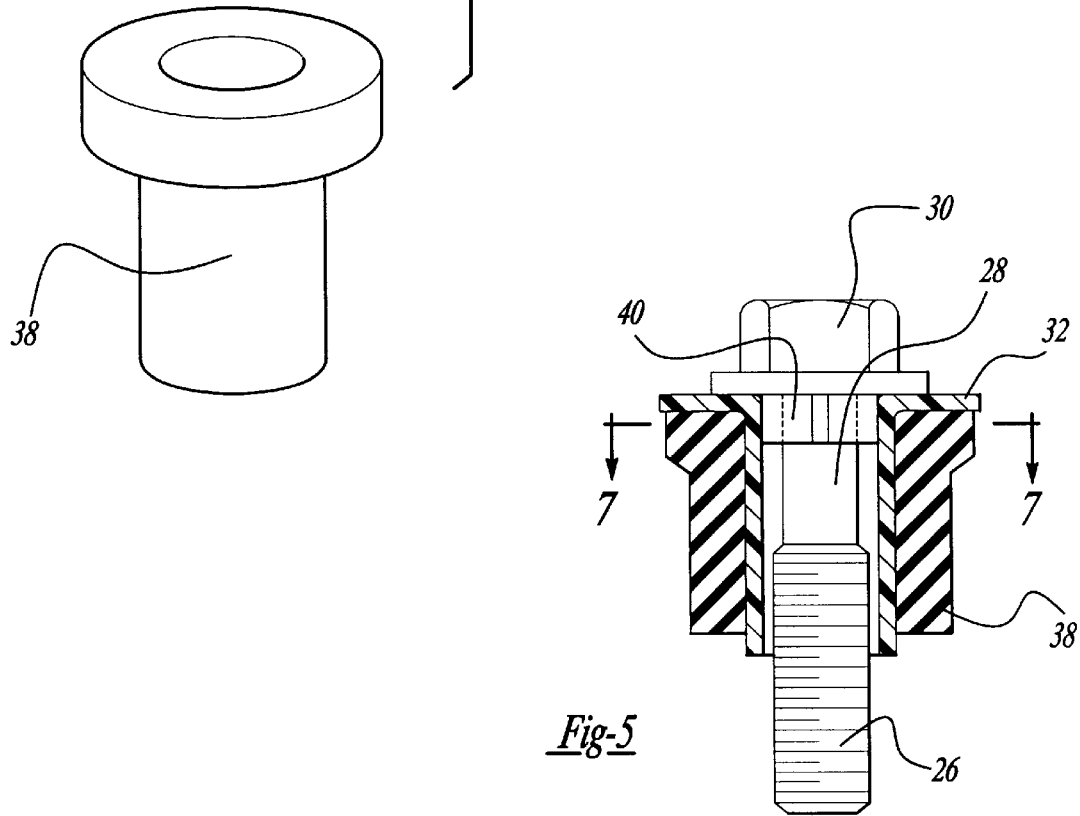
*Fig-4*
*Fig-5*

CAPTIVATED FASTENER ASSEMBLY

BACKGROUND OF THE INVENTION

This invention relates to threaded fastener assemblies and, more particularly, to assemblies in which the fastener is captivated within the workpiece.

1. Discussion

Manufacturers are constantly striving to increase productivity by reducing assembly time during the manufacturing process. It is known in the art to streamline manufacturing by pre-attaching the fasteners to structural members which are later used in the assembly of a component.

FIGS. 1 and 2 illustrate a known captivated fastener assembly which is used to secure a valve cover to an engine cylinder head. The assembly 10 generally includes three pieces: fastener 12, sleeve 14 and grommet 16. It is necessary that the fastener 12 be able to slide axially within the bore of sleeve 14. On the other hand, it is also important that the assembly 10 remain assembled and not fall apart during shipment or when the cover is mounted to the engine cylinder head. Thus, there is a requirement that the fastener be "captivated" within the workpiece. A common commercially used design for accomplishing these goals employs an enlarged ring 18 which is formed on the fastener shank which cooperates with a reduced diameter section 20 formed in the sleeve 14. The outer diameter of the ring 18 and inner diameter defined by the sleeve section 20 are such that the fastener can be pushed through the sleeve so that the ring 18 falls below section 20 yet there still remains a sufficient interference between the ring 18 and section 20 to prevent the ring (and thus the fastener) from again passing upwardly past section 20 which otherwise would permit separation of the fastener from the sleeve 14.

This design requires special forming steps to generate the ring 18 on the fastener and the reduced diameter section 20 on the sleeve. Typically, the ring 18 is formed during the thread rolling process of the fastener and the section 20 is formed with a punch and die operation. It is very important that tight tolerances be kept during these forming processes. If the difference between the relative diameters is too great, then it is difficult and sometime not possible to insert the fastener 12 into the sleeve 14. On the other hand, if the ring outer diameter is too small relative to the section 20 inner diameter then the fastener can become separated from the sleeve.

Therefore, it would be desirable to provide a captivated fastener assembly that overcomes one or more of these problems.

SUMMARY OF THE INVENTION

In accordance with the teachings of this invention, the need for the fastener ring 18 and the reduced diameter section 20 on sleeve 14 is eliminated. Instead, a conventional threaded fastener can be used and a sleeve having an easier-to-form straight walled bore can be employed yet the same goal can be obtained. The captivation of the fastener is obtained by a flexible retainer which can be slipped over the threaded portion of the fastener shank and freely slide relative to the unthreaded portion of the fastener shank. After the retainer is slid onto the fastener, the sleeve is assembled to the fastener by inserting the retainer within the workpiece bore. The head of the fastener engages the upper surface of the workpiece to thereby press the retainer flush with the top surface of the workpiece. The outer diameter of the retainer is slightly larger than the inner diameter of the workpiece bore so that a press fit interference therebetween occurs. The fastener can move axially within the bore since there is a free flowing fit between the inner bore of the retainer and the unthreaded portion of the fastener. The threaded portion of the fastener, however, defines an outer diameter which is larger than the inner diameter of the retainer. Thus the tips of the threads engage the retainer if the fastener moves too far thereby preventing the fastener from being removed from the workpiece.

BRIEF DESCRIPTION OF THE DRAWINGS

FIG. 3 is an exploded perspective view of an assembly made in accordance with the teachings of this invention;

FIG. 4 is a side view showing the retainer preassembled onto the fastener;

FIG. 5 is a side cross sectional view showing the fastener and retainer mounted to the workpiece;

DETAILED DESCRIPTION OF THE INVENTION

Figure 1:
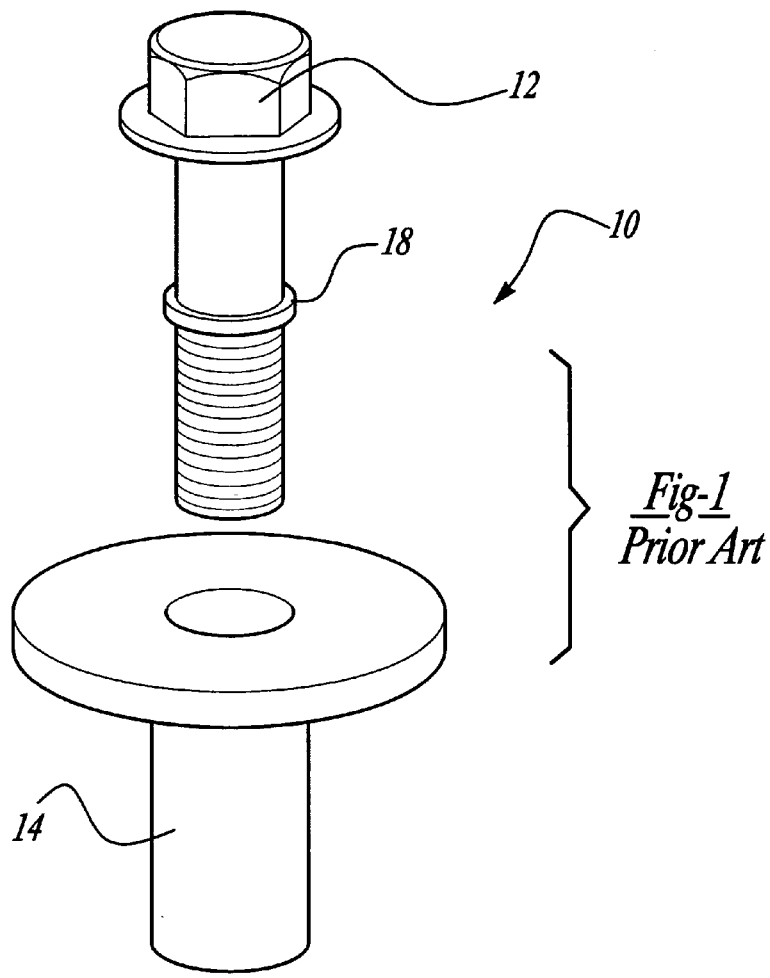
FIG 1 is an exploded perspective view of a prior art captivated fastener assembly.
Figure 2:
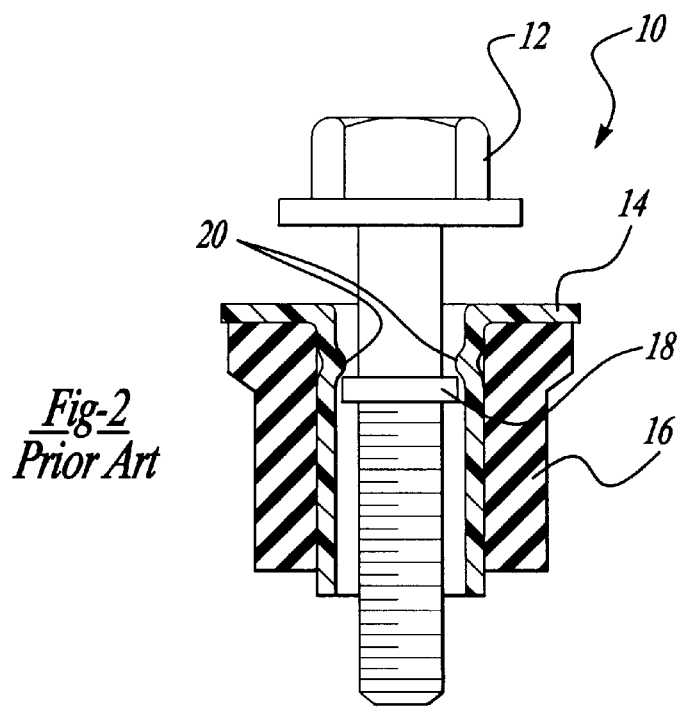
FIG. 2 is a cross sectional assembled view of FIG. 1 which further includes a grommet.

The elegant simplicity of this invention can be appreciated by comparing FIGS. 1 and 2 with FIGS. 3 and 5. The fastener 24 of the inventive preassembled captivated fastener assembly 22 does not require the ring 18. Instead, it is of a conventional design which is economical to produce. Fastener 24 includes a threaded portion 26 on the lower portion of the shank and an unthreaded portion 28 of reduced diameter on the upper portion of the shank below the head 30.

The workpiece, in this example, takes the form of a sleeve 32 having an inner bore 34 which is free of the section 20 of reduced diameter as required in the prior art example of FIGS. 1 and 2. Upper portions of sleeve 32 are formed into a flange 36. While the entire sleeve bore 34 is shown as being straight-walled along its full length, sleeves with swaged-out counter bore configurations can also be used, as can other workpieces with various designs.

A compressible washer or grommet 38 rounds out the assembly 22 except for retainer 40.

Figure 6:
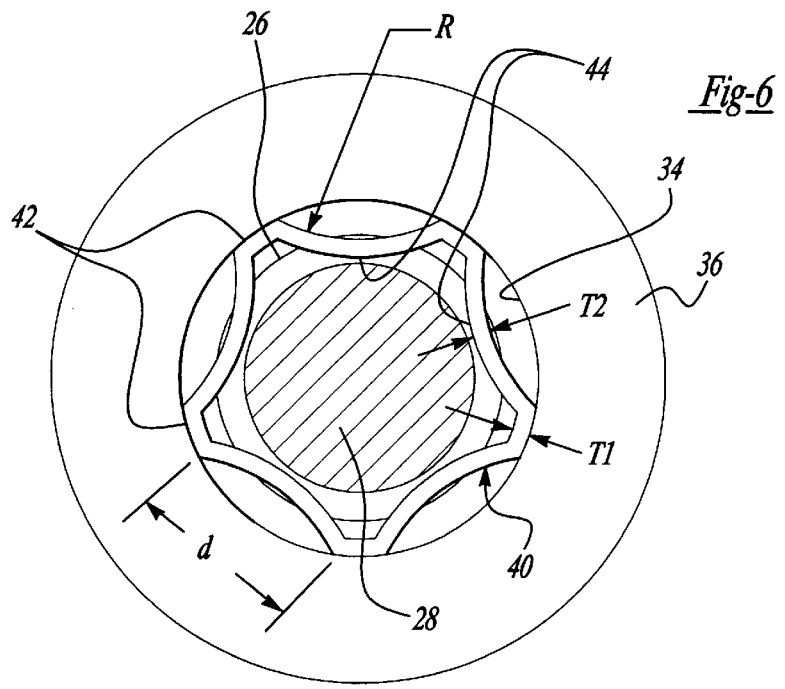
FIG. 6 is a cross sectional view along lines 6—6 of FIG. 5.

Special attention should now be directed to retainer 40 and its method of assembly which will now be described in connection with the remaining figures. As can be best seen in FIG. 6, retainer 40 has radially outwardly extending ear portions 42 and a plurality of longitudinally extending radially inwardly projecting concave arches 44. The arches and ear portions are alternately and symmetrically disposed about the annular body. The ear portions 42 include points which seat against the inner wall of the bore 34 and define an outer diameter for the retainer. The arches 44 include innermost points which define the inner diameter. By way of a specific example, the ear portion wall thickness T1 is about 0.50 mm and the arch wall thickness T2 is also about 0.50 mm. The arch portion radius of curvature R is about 3.00 mm, with the tangential distance between ear portions d being about 2.50 mm.

Retainer 40 is generally of the type disclosed in U.S. Pat. No. 5,395,194 entitled "Convoluted Bolt Retainer" which is hereby incorporated by reference. However, retainer 40 has been modified in order to solve the particular problems at hand. Retainer 40, according to this invention, retainer 40 has an inner diameter which is less than the outer diameter defined by the radially extending threads 26 on the fastener 24, yet the retainer inner diameter is greater than the diameter of the unthreaded shank portion 28. The outer diameter of retainer 40 is larger than the inner diameter of sleeve bore 34. The axial length of retainer 40 is less than the axial length of unthreaded fastener portion 28. Preferably, the axial length of the retainer is no longer than the OD of the fastener threaded portion (also known as the major diameter of the bolt) and no smaller than about 75% thereof. While various materials can be employed, retainer 40 is preferably made by injection molding of a low density polyethylene.

The configuration of the arches 44 of retainer 40 allows not only axial movement of fastener 30 but also some radial and tilting movement which facilitates alignment of the fastener with the tapped hole in the engine cylinder head during the final assembly process which will be described later herein. The configuration of the outer ear portion wall of retainer 40 is designed so it will provide sufficient adhesion with the inner wall of the sleeve bore 34 to retain the fastener in a captivated state and prevent it from slipping out of the sleeve during typical impact loads which may be encountered during shipment. As will appear, during normal conditions the unthreaded shank portion 28 does not touch the inner walls of the arches 44. Thus, the fastener shank does not provide any additional radially outward force which would hold the retainer in place against the sleeve bore 34 as in the specific example disclosed in the '194 patent. The present invention thereby increases the stiffness of the system by increasing the number of arches to five in which their spans are less than about 36 degrees. In addition the wall thickness of the retainer is made constant throughout the retainer. The difference between the outer diameter of the retainer 40 and the inner diameter of sleeve bore 34 is also increased in order to increase adhesion of the retainer.

The following table illustrates representative examples of the various dimensions for the components just described where the fastener 30 is an M6 bolt:

TABLE I

| Component Description | Dimension |
| --- | --- |
| Outer diameter of unthreaded fastener portion 28 | 5.20 mm |
| Outer diameter of threaded fastener portion 26 | 5.85 mm |
| Inner diameter of sleeve bore 34 | 7.40 mm |
| Inner diameter of retainer 40 | 5.65 mm |
| Outer diameter of retainer 40 | 7.50 mm |

Turning now to FIG. 4, retainer 40 is initially assembled to fastener 30 by slipping the retainer 40 over threaded portion 26 onto unthreaded portion 28. The arches 44 of the retainer 40 are sufficiently resilient so that they can easily slide over the fastener threads 26. Thereafter, the retainer 40 is free to slide easily along unthreaded fastener portion 28. When the retainer 40 is slid over the fastener threaded portion 26 the arches 44 deflect outwardly. However, the arches 44 spring back radially inwardly to define the inner diameter for the retainer which remains less than the outer diameter of threaded portion 26.

Figure 8:
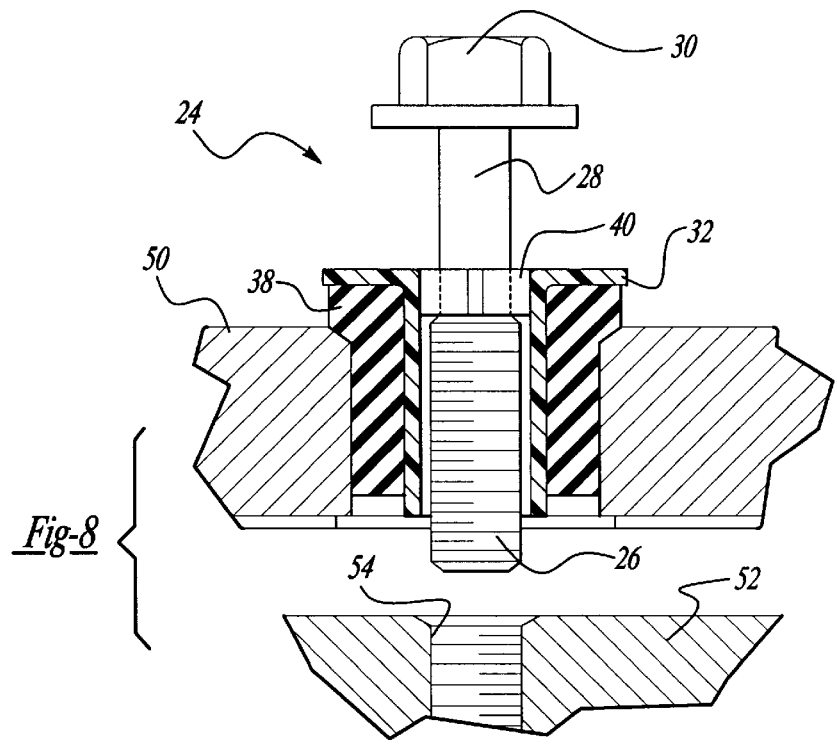
FIG. 8 is an exploded view, with one of the assemblies being shown in cross section.

The next step as shown in FIG. 5 is to assemble the fastener/retainer onto the sleeve 32. This is easily accomplished by moving the sleeve 32 relative to the retainer 40 until the lower surface of fastener head 30 abuts the upper surface of sleeve 32. This action automatically press fits the retainer 40 within sleeve bore 34 and positions retainer 40 flush with the upper surface of sleeve 32. The compressive forces from the press fit are sufficient to maintain the retainer in the position shown in FIG. 5 and hold the fastener in a captivated state even though the shank of the fastener may experience axial impact loads which are typically encountered during shipment. As shown in FIG. 8, if the fastener 12 moves upwardly, the threads 26 will engage the lower surfaces of the arches of retainer 40 and be prevented from further upward movement thereby keeping the fastener captivated.

The grommet 38 is then slid about the outer walls of sleeve 32 to complete the assembly 22.

Figure 7:
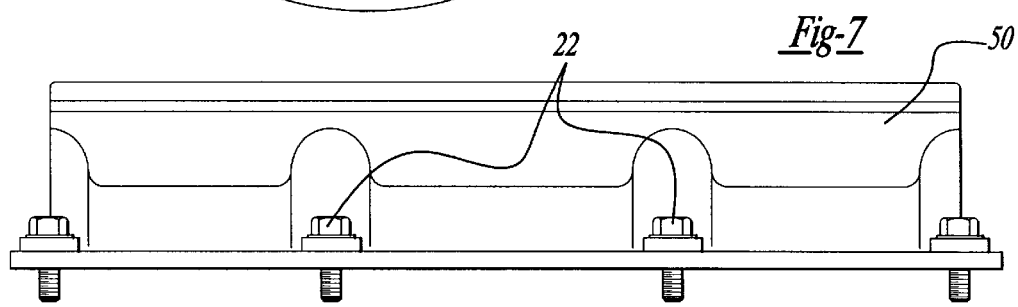
FIG. 7 is a view showing the captivated fastener assemblies on a valve cover.

A plurality of these captivated assemblies are shown in FIG. 7 mounted to a valve cover 50 which is later to be screwed onto an engine cylinder head 52. The grommets 38 provide sufficient adhesion to their respective counter bores in the cover to prevent displacement of the assemblies while the retainers 40 keep the fasteners 30 captivated as described above. During assembly to the head 52 the valve cover 50 is placed on the cylinder head so that the fasteners 30 are generally aligned with the tapped holes 54 on the cylinder head. The worker then engages the fastener head 30 with a tool such as an automatic nut runner and manipulates the tool to initially engage the bottom portion of the fastener threads 26 with the upper threads of the tapped hole 54. Since the retainer 40 allows the fastener 24 to move radially and tiltably it becomes easier to axially align the fastener with the tapped hole 54 thereby preventing cross threading.

It should now be appreciated that the present invention offers some significant advantages over the commonly used techniques of the prior art. The steps required for forming the fastener ring 18 and the sleeve reduced diameter section 20, and for consistently maintaining accurate dimensions thereof, are avoided thereby providing cost savings. In contrast the retainer 40 is easily and inexpensively reproducible. Various other advantages and modifications will become apparent to those skilled in the art after having the benefit of studying the foregoing specification. Therefore, it should be understood that such modifications do not depart from the scope of the invention as defined by the claims which follow.

What is claimed is:

1. A captivated fastener assembly comprising:

a fastener having a head and a shank, the shank of the fastener having a given length and a threaded portion in which the outer tips of the threads define a given outer diameter, the shank of the fastener further including an unthreaded portion between the threaded portion and the head of the fastener, the unthreaded portion having a given diameter which is less than the diameter of the threaded portion;

a workpiece having a straight-walled internal bore of a given constant diameter extending through the entire workpiece; and a convoluted polymeric annular retainer having an outer diameter defined by plural ear portions and an inner diameter defined by plural arches, the outer diameter being greater than the inner diameter of the workpiece bore, the inner diameter of the retainer being less than the diameter of the fastener threaded portion; and the retainer being press fit within the bore of the workpiece, the shank of the fastener extending through the retainer such that the threaded portion is located below the retainer, wherein the fastener can slide axially relative to the workpiece along the extent of the unthreaded fastener portion, with the fastener being captivated within the workpiece due to the engagement of the fastener threads with the retainer, and said arches and said ear portions being configured to provide sufficient adhesion between the retainer and the straight-walled bore to minimize occurrences of the retainer being forced out of the workpiece when the fastener experiences impact loads of the type normally incurred during shipment.

2. The assembly of claim 1 wherein the retainer is press fit within the workpiece bore such that an upper surface of the retainer is substantially flush with an upper surface of the workpiece.

3. The assembly of claim 1 wherein the retainer is made of a polymeric material.

4. The assembly of claim 1 wherein the retainer includes a plurality of alternating radially inwardly extending arches and outwardly radially extended ear portions, inner portions of the arches defining the inner diameter of the retainer and outer portions of the ear portions defining an outer diameter for the retainer.

5. The assembly of claim 4 wherein the arches span no more than about 36 degrees.

6. The assembly of claim 5 wherein the retainer includes five equally spaced radially extending arches.

7. The assembly of claim 6 wherein the retainer is made of a flexible polymeric material having substantially the same wall thickness throughout its axial length.

8. The assembly of claim 1 wherein the axial depth of the retainer is less than the length of the unthreaded fastener portion.

9. The assembly of claim 1 wherein said workpiece is a sleeve having a flange defining an upper surface for the workpiece.

10. A captivated fastener assembly comprising:

a fastener having a head and a shank, the shank of the fastener having a given length, said fastener having a threaded portion in which outer tips of the threads define a given outer diameter, the shank of the fastener further including an unthreaded portion between the threaded portion and the head of the fastener, the unthreaded portion having a given diameter which is less than the diameter of the threaded portion;

a workpiece having an upper surface and a lower surface, with a bore extending therethrough of a given diameter;

a polymeric convoluted retainer having a plurality of alternately radially inwardly extending arches and outwardly radially extending ear portions, inner portions of the arches defining an inner diameter of the retainer and outer portions of the ear portions defining an outer diameter for the retainer, the outer diameter of the retainer being greater than the inner diameter of the workpiece bore, the inner diameter of the retainer being less than the diameter of the fastener threaded portions and the inner diameter of the retainer being greater than the diameter of the fastener unthreaded portion; and said retainer being press fit within the bore of the workpiece, the retainer being located in a straight-wall portion of the bore such that the retainer is unrestrained vertically by any inwardly projecting portions of the bore, the shank of the fastener extending through the retainer such that the threaded portion is located below the retainer and the unthreaded portion is spaced from the arches when the fastener is concentrically located within the retainer, the fastener being free to move upwardly through the retainer until the threads of the fastener engage the arches of the retainer thereby captivating the fastener within the workpiece, and the configuration of the arches and ear portions providing sufficient adhesion between the retainer and the bore to prevent the retainer from being forced from the bore due to certain impact loads on the fastener.

11. The assembly of claim 10 wherein the retainer has an axial length which is no longer than the outer diameter of the fastener threaded portion and no smaller than about 75 percent thereof.

12. The assembly of claim 10 wherein the adhesion of the retainer to the bore is increased by employing a plurality of arches having spans less than about 36° whereby the retainer resists removal from the bore by said impact loads even though the fastener unthreaded portion does not provide radial outward forces on the arches to hold the retainer in the bore.

13. The assembly of claim 10 wherein the arches and ear portions have wall thicknesses which are substantially constant.

* * * * *